(12) United States Patent
Schrier et al.

(10) Patent No.: US 11,087,186 B2
(45) Date of Patent: *Aug. 10, 2021

(54) FIXATION GENERATION FOR MACHINE LEARNING

(71) Applicant: Ford Global Technologies, LLC, Dearborn, MI (US)

(72) Inventors: Madeline Jane Schrier, Palo Alto, CA (US); Vidya Nariyambut Murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,327

(22) Filed: Oct. 18, 2019

(65) Prior Publication Data

US 2020/0050905 A1 Feb. 13, 2020

Related U.S. Application Data

(63) Continuation of application No. 14/997,051, filed on Jan. 15, 2016, now Pat. No. 10,489,691.

(51) Int. Cl.
*G06K 9/66* (2006.01)
*G06K 9/00* (2006.01)
(Continued)

(52) U.S. Cl.
CPC .............. *G06K 9/66* (2013.01); *G05D 1/021* (2013.01); *G06K 9/00791* (2013.01);
(Continued)

(58) Field of Classification Search
None
See application file for complete search history.

(56) References Cited

U.S. PATENT DOCUMENTS 8,675,966 B2 3/2014 Tang
9,025,880 B2 5/2015 Perazzi
(Continued)

FOREIGN PATENT DOCUMENTS

CN 103955718 A 7/2014
CN 102496023 B 8/2014

OTHER PUBLICATIONS

Wong, Lai-Kuan, and Kok-Lim Low. "Saliency-enhanced image aesthetics class prediction." Image Processing (ICIP), 2009 16th IEEE International Conference on. IEEE, 2009. (Year: 2009).*

(Continued)

*Primary Examiner* — Vu Le
*Assistant Examiner* — Tracy Mangialaschi
(74) *Attorney, Agent, or Firm* — David R. Stevens; Stevens Law Group (57) ABSTRACT

The disclosure extends to methods, systems, and apparatuses for automated fixation generation and more particularly relates to generation of synthetic saliency maps. A method for generating saliency information includes receiving a first image and an indication of one or more sub-regions within the first image corresponding to one or more objects of interest. The method includes generating and storing a label image by creating an intermediate image having one or more random points. The random points have a first color in regions corresponding to the sub-regions and a remainder of the intermediate image having a second color. Generating and storing the label image further includes applying a Gaussian blur to the intermediate image.

20 Claims, 8 Drawing Sheets

(51) Int. Cl.
  *G06T 7/70* (2017.01)
  *G06K 9/46* (2006.01)
  *G06T 5/00* (2006.01)
  *G05D 1/02* (2020.01)
  *G08G 1/16* (2006.01)

(52) U.S. Cl.
  CPC ............ *G06K 9/4619* (2013.01); *G06T 5/002* (2013.01); *G06T 7/70* (2017.01); *G08G 1/166* (2013.01); *G06T 2207/20081* (2013.01); *G06T 2207/20084* (2013.01); *G06T 2207/30196* (2013.01); *G06T 2207/30252* (2013.01)

(56) References Cited

U.S. PATENT DOCUMENTS

| | | |
|---|---|---|
| 9,042,648 B2 | 5/2015 | Wang |
| 2013/0342758 A1 | 12/2013 | Greisen |
| 2014/0254922 A1 | 9/2014 | Wang |

OTHER PUBLICATIONS

Liu, Nian, et al. "Predicting eye fixations using convolutional neural networks." Computer Vision and Pattern Recognition (CVPR), 2015 IEEE Conference on. IEEE, 2015. (Year: 2015).*

Rajashekar, Umesh, et al. "GAFFE: A gaze-attentive fixation finding engine." IEEE transactions on image processing 17.4 (2008): 564-573. (Year: 2008).*

Yeh, Hsin-Ho, Keng-Hao Liu, and Chu-Song Chen. "Salient object detection via local saliency estimation and global homogeneity refinement." Pattern Recognition 47.4 (2014): 1740-1750. (Year: 2014).*

Mishra, Ajay K., et al. "Active visual segmentation." IEEE transactions on pattern analysis and machine intelligence 34.4 (2011): 639-653. (Year: 2011).*

Vikram, Tadmeri Narayan, Marko Tscherepanow, and Britta Wrede. "A saliency map based on sampling an image into random rectangular regions of interest." Pattern Recognition 45.9 (2012): 3114-3124. (Year: 2012).*

Frequency-tuned Salient Region Detection, Radhakrishna Achantay, Sheila Hemamiz, Francisco Estraday, and Sabine Susstrunk, School of Computer and Communication Sciences (IC)(2009).

Learning to Detect a Salient Object, Tie Liu, Jian Sun, Nan-Ning Zheng, Xiaoou Tang, Heung-Yeung Shum, Xi'an Jiaotong University (2010).

A. Angelova, A. Krizhevsky, V. Vanhoucke Pedestrian Detection with a Large-Field-Of-View Deep Network, IEEE International Conference on Robotics and Automation (ICRA) 2015.

M. Kümmerer, L. Theis, and M. Bethge. Deep Gaze I: Boosting Saliency Prediction with Feature Maps Trained on ImageNet. ICLR Workshop, May 2015.

* cited by examiner

FIXATION GENERATION FOR MACHINE LEARNING

CROSS-REFERENCE TO RELATED APPLICATIONS

This application is a continuation of and claims the benefit of and priority to U.S. patent application Ser. No. 14/997,051, filed Jan. 15, 2016, the entire contents of which are expressly incorporated by reference.

TECHNICAL FIELD

The disclosure relates generally to methods, systems, and apparatuses for automated fixation generation and more particularly relates to generation of synthetic saliency maps.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Training of automated systems for object detection based on sensor data is often necessary to enable automated driving systems or driving assistance systems to safely identify and avoid obstacles or to drive safe.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

In order to operate safely, an intelligent vehicle should be able to quickly and accurately recognize a pedestrian. For active safety and driver assistance applications a common challenge is to quickly and accurately detect a pedestrian and the pedestrian's location in a scene. Some classification solutions have been achieved with success utilizing deep neural networks. However, detection and localization are still challenging as pedestrians are present in different scales and at different locations. For example, current detection and localization techniques are not able to match a human's ability to ascertain a scale and location of interesting objects in a scene and/or quickly understand the "gist" of the scene.

Applicants have developed systems, devices, and methods that improve automated pedestrian localization and detection. At least one embodiment uses a two-stage computer vision approach to object detection. In a first stage, one or more regions of a sensor data (such as an image) are identified as more likely to include an object of interest (such as a pedestrian). For example, the first stage may produce indications of likely regions where objects are located in the form of a saliency map. The second stage determines whether an object of interest is actually present within one or more regions identified in the first stage. For example, the second stage may use a saliency map output by the first stage and at least a portion of the original image to determine whether an object of interest is actually present within the one or more regions. However, neural networks or other models that may be used in either the first or second stage may first need to be trained and tested. Because obtaining sensor data, saliency maps, or other data that may be used to train the neural networks, models, or algorithms can be very difficult time consuming, and/or expensive, it can be very difficult or expensive to implement the above two stage approach.

In light of the foregoing, applicants have developed solutions for the creation and use of synthetic saliency maps. These synthetic saliency maps may be used for, and significantly reduce required time and costs of, training or testing of deep learning algorithms. According to one embodiment, a method includes receiving a first image and an indication of one or more sub-regions within the first image corresponding to one or more objects of interest. The method includes generating and storing a label image. Generating the label image includes creating an intermediate image that includes one or more random points having a first color in regions corresponding to the sub-regions, with a remainder of the intermediate image having a second color. Generating the label image also includes applying a Gaussian blur to the intermediate image.

According to some embodiments, an artificial saliency map may be generated based on an image and associated ground truth bounding boxes for objects of interest. An image may be generated with a number of random points within the bounding boxes (or within regions corresponding to the bounding boxes). Each randomly generated point is made to be a white pixel on the label and all others in the image are black. A Gaussian blur, or other blur, is applied to the binary image and stored at a low resolution as the label for the corresponding image. The label and the original image may be fed into a deep neural network, which outputs a saliency map used to predict the location of objects of interest in an image. A deep neural network may be similar to those discussed and described in "Deep Gaze I: Boosting Saliency Prediction with Feature Maps Trained on ImageNet" by M. Kummerer, L. Theis, and M. Bethge (November 2014).

As used herein, the term "fixation" refers to an indication or label directing attention to an area or region of sensor data where information may be presented. For example, information identifying a region within an image where an object recognition algorithm should look for an object is one type of indication of fixation. Similarly, any identifier of regions where salient or relevant information is located may be referenced herein as fixation. In one embodiment, by determining fixation regions, less time and processing resources may be required to detect objects or make other determinations based on sensor data because less than all sensor data may need to be analyzed.

In one embodiment, low resolution labels or saliency maps may be used. For example, psycho-visual studies have shown that fixations from lower-resolution images may predict fixations on higher-resolution images. Thus, use of a very low resolution version of an artificial saliency as the label for the corresponding image may be possible and may reduce the computational power needed. Furthermore, blurs may be fit with ellipses to better predict an object's scale and location. For example, pedestrians generally have a greater height than width and are oriented vertically. Thus, a vertically oblong ellipse may be used as a shape for blurs.

In an embodiment, the disclosure applies saliency maps for object detection, which is an improvement over the current state of the art. Furthermore, in an embodiment, the disclosure creates synthetic salient maps to mimic human perception without the exhaustive work of collecting new gaze fixation annotations on datasets. Additionally, data produced in at least some embodiments do not require a removal of center bias which is often required for fixation annotations or datasets produced based on human fixation.

Figure 1:
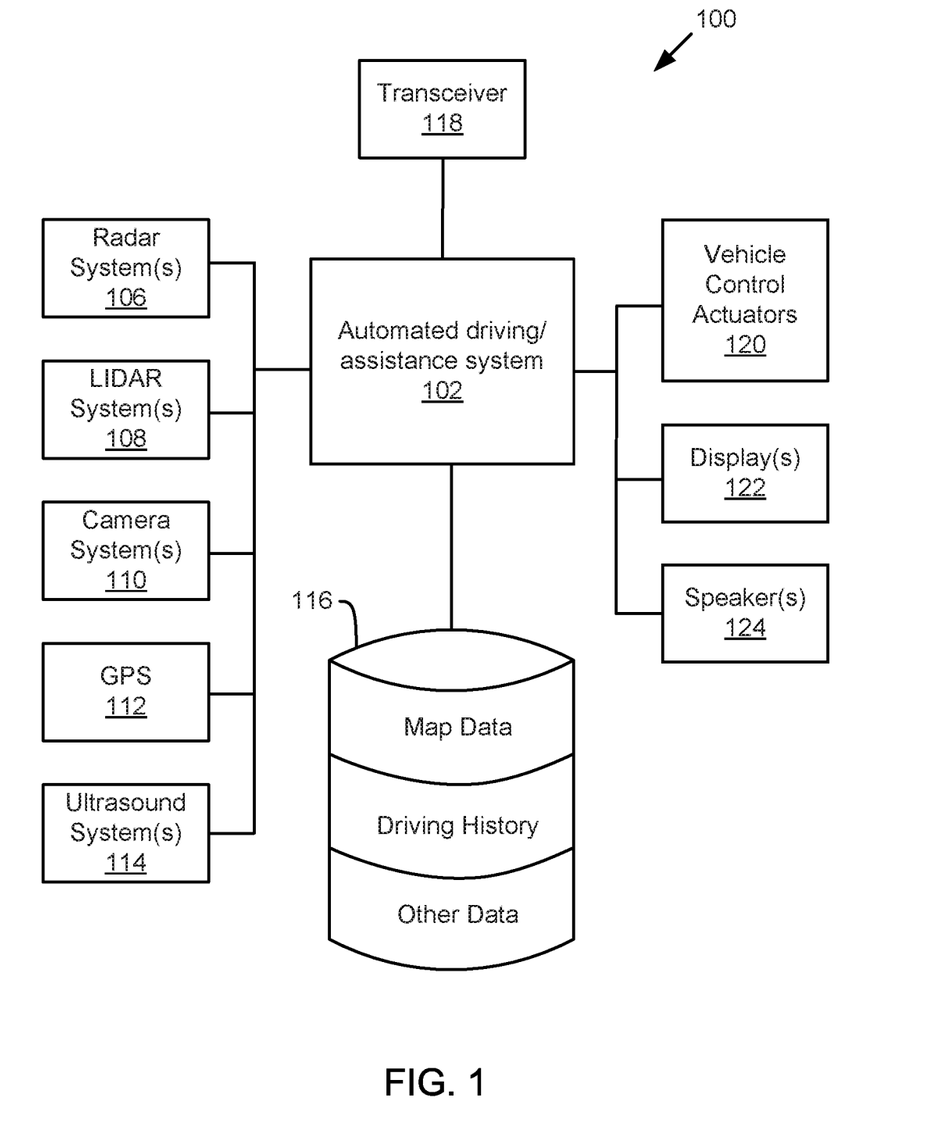
FIG. 1 is a schematic block diagram illustrating an example implementation of a vehicle control system that includes an automated driving/assistance system.

Referring now to the figures, FIG. 1 illustrates an example vehicle control system 100 that may be used to automatically detect, classify, and/or localize objects. An automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting the presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement an algorithm or use a model, such as a deep neural network, to process the sensor data to detect, identify, and/or localize one or more objects. However, in order to train or test a model or algorithm, large amounts of sensor data and annotations of the sensor data may be needed.

Figure 2:
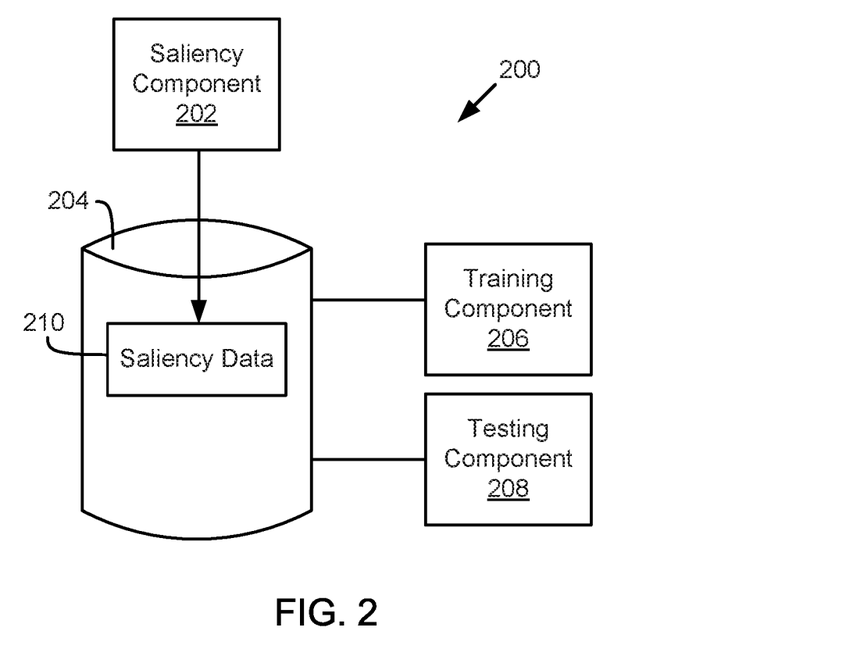
FIG. 2 is a schematic block diagram illustrating an implementation of a system for automatic fixation generation.

Referring now to FIG. 2, one embodiment of a system 200 for automatic fixation generation is shown. The system 200 includes a saliency component 202, storage 204, a training component 206, and a testing component 208. The saliency component 202 is configured to determine saliency information based on a data image and ground truth data. The data image may include a frame of sensor data and the ground truth may include information about the frame sensor data. For example, the ground truth may include one or more bounding boxes, a classification, an orientation, and/or a relative location for objects of interest within the sensor data. The bounding boxes may include indications of one or more sub-regions within the data image corresponding to one or more objects of interest. The classification may include an indication of a type or classification of a detected object. For example, the classification may indicate that a detected object is a vehicle, a pedestrian, a cyclist, a motorcycle, road debris, a road sign, a lane barrier, a tree or plant, a building, a parking barrier, a side walk, or any other object or feature on or near a roadway. The orientation may indicate an orientation of an object or a direction of travel of an object, such as an orientation or direction of travel of a vehicle, a pedestrian, or any other object. The relative location may indicate a distance between a vehicle and the object.

The saliency component 202 may determine saliency information by automatically generating an artificial label or artificial saliency map based on the data image and/or the ground truth. According to one embodiment, the saliency component 202 may generate multiple random points (which are set to be white pixels) within an indicated bounding box, set all other pixels black, perform a Gaussian blur to the image to produce a label, store a low resolution version of the label, and generate a saliency map based on the data and label information to predict the location of objects in the image. The saliency component 202 may output and/or store saliency data 210 to storage 204. For example, the saliency data may store a label image or a saliency map as part of the saliency data 210.

The training component 206 is configured to train a machine learning algorithm using the data image and any corresponding ground truth or saliency data 210. For example, the training component 206 may train a machine learning algorithm or model by providing a frame of sensor data with a corresponding label image or saliency map to train the machine learning algorithm or model to output a saliency map or predict locations of objects of interest in any image. For example, the machine learning algorithm or model may include a deep neural network that is used to identify one or more regions of an image that include an object of interest, such as a pedestrian, vehicle, or other objects to be detected or localized by an automated driving/assistance system 102. In one embodiment, the deep neural network may output the indications of regions in the form of a saliency map or any other format that indicates fixation or saliency sub-regions of an image.

The testing component 208 may test a machine learning algorithm or model using the saliency data 210. For example, the testing component 208 may provide an image or other sensor data frame to the machine learning algorithm or model, which then outputs a saliency map or other indications of fixation or saliency. As another example, the testing component 208 may provide an image or other sensor data frame to the machine learning algorithm or model, which determines a classification, location, orientation, or other data about an object of interest. The testing component 208 may compare the output of the machine learning algorithm or model with an artificial saliency may or ground truth to determine how well a model or algorithm performs. For example, if the saliency maps or other details determined by the machine learning algorithm or model are the same or similar, the testing component 208 may determine that machine learning algorithm or model is accurate or trained well enough for operation in a real-world system, such as the automated driving/assistance system 102 of FIG. 1.

Figure 3:
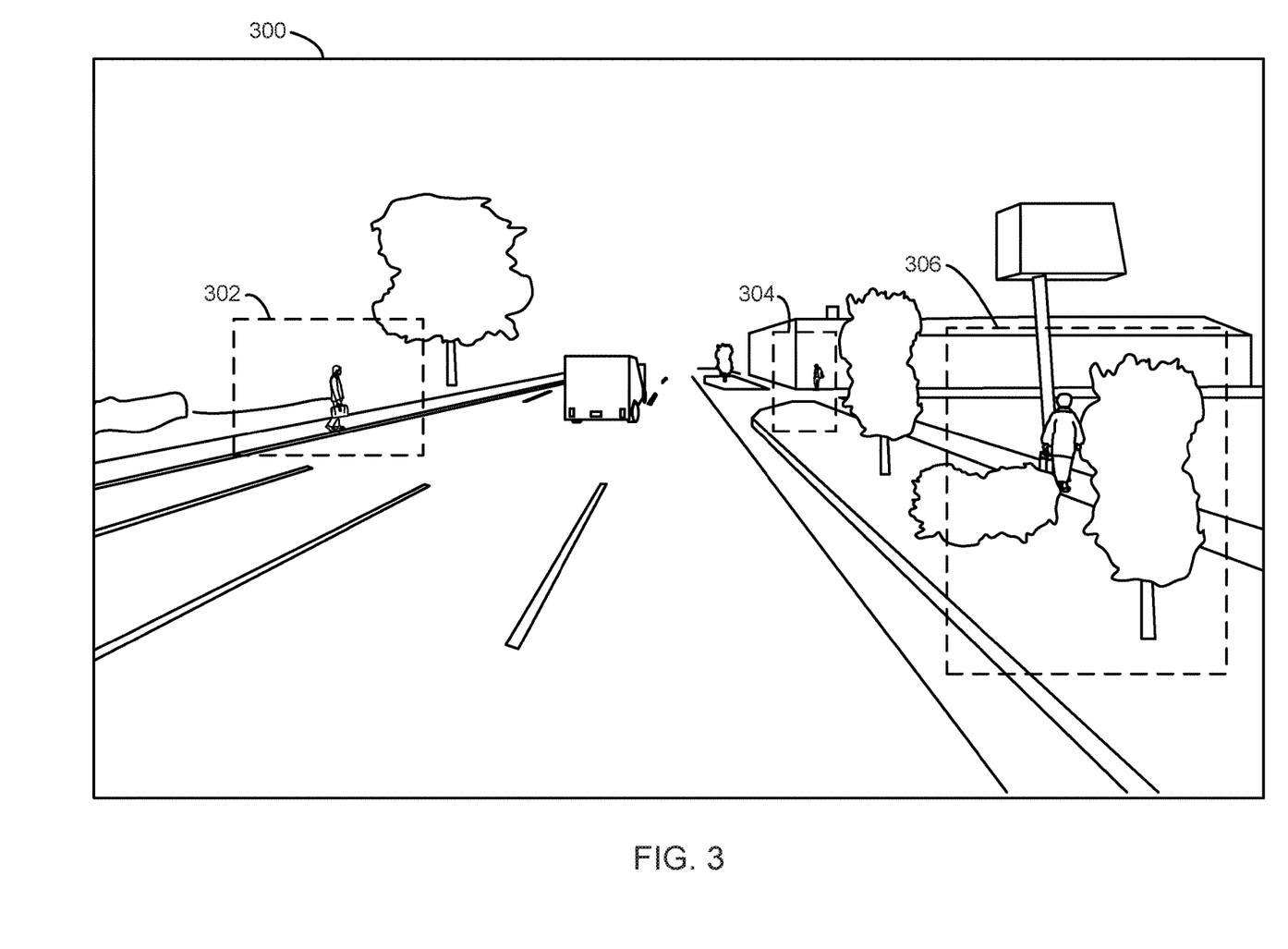
FIG. 3 illustrates an image of a perspective view of a driving environment.

FIG. 3 illustrates a perspective view of an image 300 that may be captured in a driving environment. For example, the image 300 illustrates a scene of a road in front of a vehicle that may be captured while a vehicle is traveling down the road. The image 300 includes a plurality of objects of interest on or near the roadway. In one embodiment, the image 300 may have associated bounding box information that defines a plurality of bounding boxes for sub-regions of the image 300 that include objects of interest. Specifically, a first bounding box 302, a second bounding box 304, and a third bounding box 306 are defined for regions that include pedestrians, which may be one type of objects of interest, or other objects of interest. For example, the image and associated bounding boxes 302-306 may be used to train a neural network to detect pedestrians or other objects of interest or test a neural network's ability to detect pedestrians or other objects of interest. Other embodiments may include image and/or bounding boxes for any type of object of interest or for a plurality of types of objects of interest.

In one embodiment, bounding box information may be included as part of ground truth for the image 300. The image 300 may be annotated with the ground truth or the ground truth may be included as part of a separate file. In one embodiment, the image 300 may remain unannotated so that a neural network or other machine learning algorithm or model may be tested or trained. In one embodiment, the ground truth may include information that defines the bounding boxes 302-306, such as x-y coordinates or other descriptions of edges or a center of each of the bounding boxes. The ground truth may also include information about what is included in the bounding boxes (e.g., a type for an object of interest) or information about a distance from a sensor or other details about the objects of interest.

Figure 4:
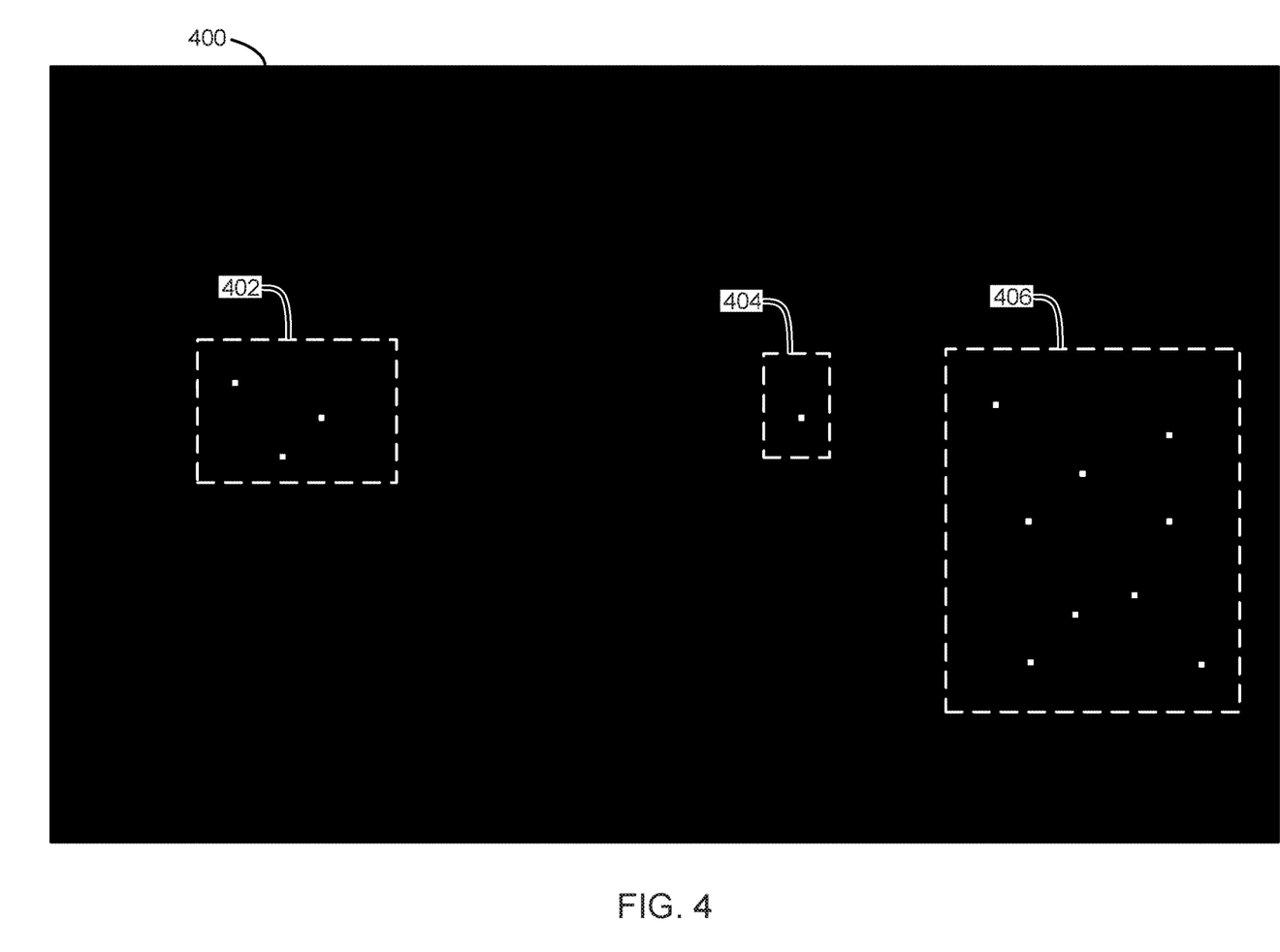
FIG. 4 illustrates an image having a plurality of random points, according to one embodiment.
Figure 5:
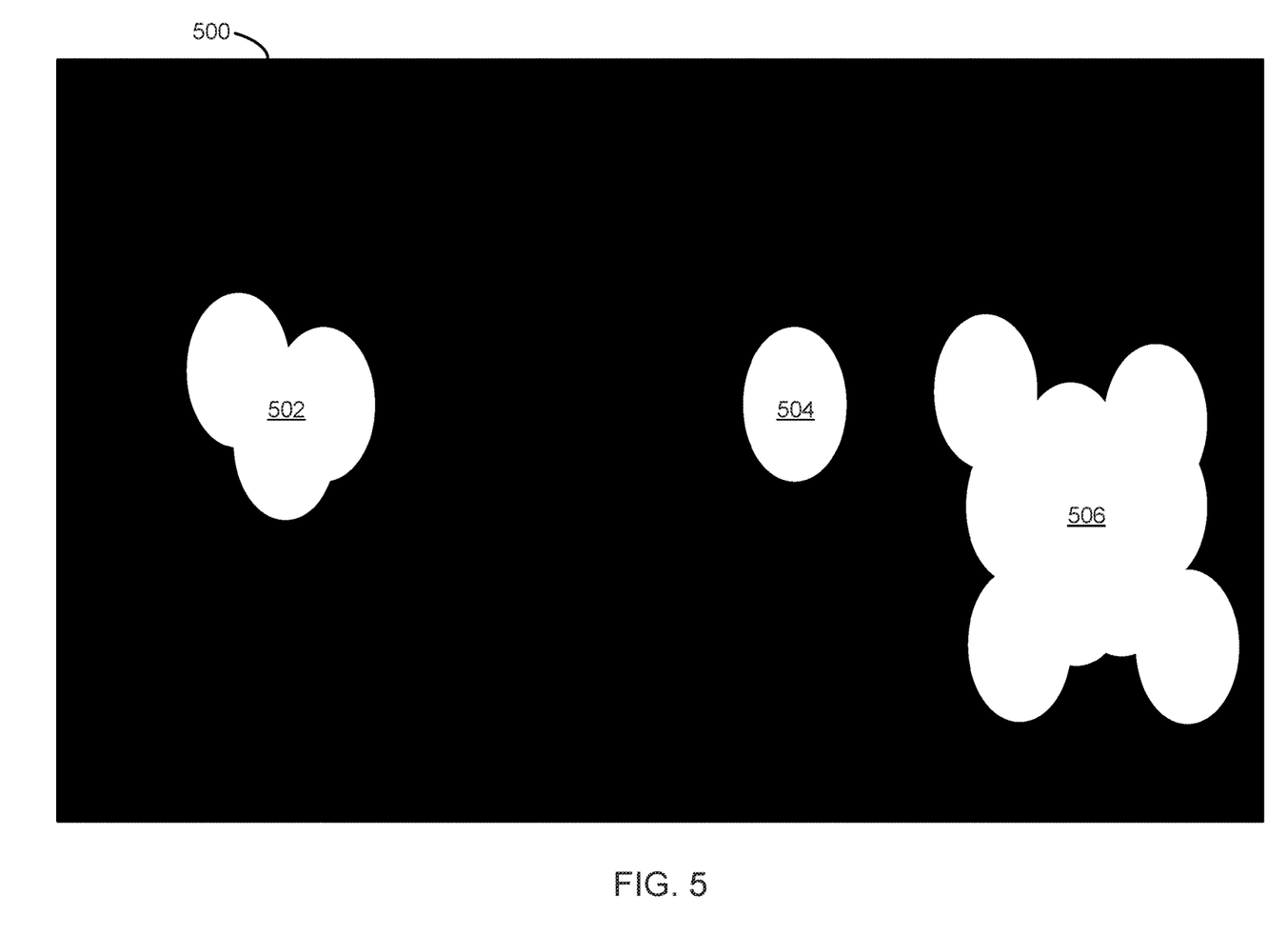
FIG. 5 illustrates a blurred version of the image of FIG. 4, according to one embodiment.
Figure 6:
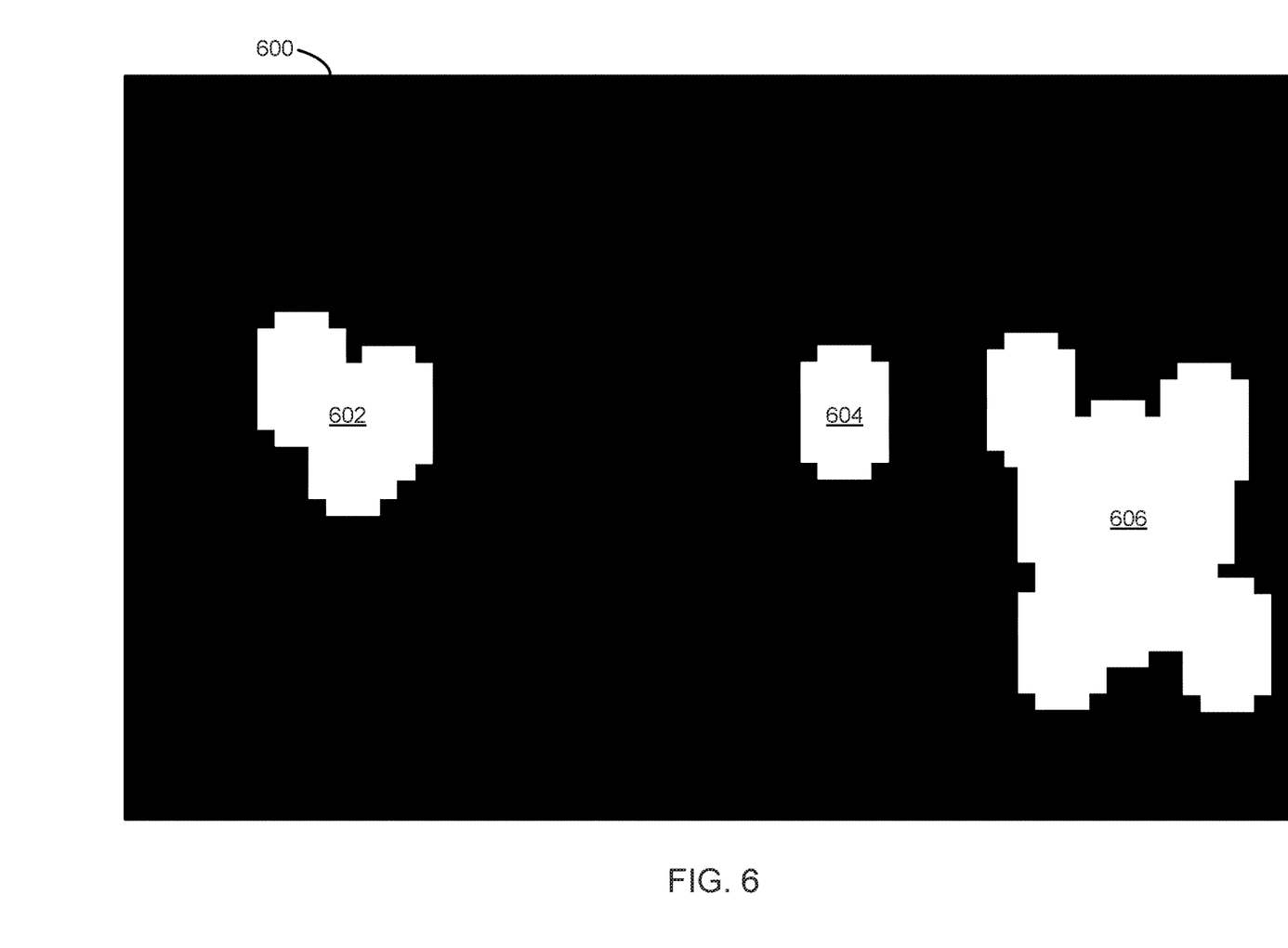
FIG. 6 illustrates a low resolution version of the image of FIG. 5, according to one embodiment.

The saliency component 202 may receive the image 300 and any associated ground truth and generate a label and/or a saliency map for the image. In one embodiment, the saliency component 202 may generate a label by creating a new image having all pixels black except for one or more random points within each bounding box indicated by the ground truth and applying a blur to the image. FIGS. 4-6 illustrate one embodiment for generation of a label image.

FIG. 4 illustrates a first intermediate image 400. The first intermediate image 400 includes an image where all pixels are black except for a plurality of random points within a first region 402, a second region 404, and a third region 406 corresponding to the bounding boxes 302-306 of FIG. 3. For example, the saliency component 202 may randomly generate points within each of the regions 402-406. Each random point may include one or more pixels. The region markers for the regions 402-406 are shown for illustration purposes and may not be included as part of the first intermediate image 400. Although the first intermediate image 400 is shown in black and white, some embodiments may include grayscale, color, or any other combination of available image types.

In one embodiment, the number of random points within the regions 402-406 is based on a size or area of the region. For example, the second region 404 is the smallest region and has only one random point and the third region 406 is the largest region and has nine random points. The first region 402 is smaller than the third region, but larger than the second region 404 and has three random points. In an embodiment, the area or one or more dimensions of the regions 402-406 may be used to calculate a number of random points. A random number generator or other randomization algorithm may be used to generate the random points within each region 402-406.

FIG. 5 illustrates a second intermediate image 500. The second intermediate image 500 includes an image with a plurality of white blur regions 502-506 on a black background. The blur regions 502-506 include a first blur region 502, a second blur region 504, and a third blur region 506 corresponding, respectively, to the first region 402, the second region 404, and the third region 406 of FIG. 4. The saliency component 202 may generate the second image 500 by applying a blur to the first intermediate image 400 of FIG. 4. For example, the saliency component 202 may generate the second image 500 by applying a Gaussian blur to the first intermediate image 400 where the blur is designed to create an ellipse shape (e.g., a two dimensional blur with a horizontal parameter different than a vertical parameter). Each ellipse may result from one of the random points in the first intermediate image 400. In one embodiment, the second intermediate image 500 is the result of a blur applied to a black and white image (e.g., a binary image) comprising the first intermediate image 400. Some embodiments may include grayscale or color images so more than two colors are possible. For example, blurring gray scale or color images may result in gradients within the white blur regions

502-506. In one embodiment, the blur size or ellipse size may be based on a location or size of the regions 402-406. For example, larger regions may receive larger ellipse sizes and/or regions located vertically higher up on the image 400 may receive smaller ellipse sizes.

In one embodiment, the second intermediate image 500 may be used as a label for the image 300 of FIG. 3. For example, blurs 502-506 may indicate regions of the data image 300 of FIG. 3 that should be processed or analyzed for object detection or recognition. In one embodiment, the second intermediate image 500 may be combined with the data image 300 to generate a saliency map that can be processed for object recognition or detection. In one embodiment, the saliency component 202 may feed the second intermediate image 500 and the image 300 into a neural network that outputs a saliency map. In one embodiment, the saliency component 202 may feed the second intermediate image 500 and the image 300 into the training component 206 or testing component 208 to train or test operation of a neural network. For example, a neural network may be trained to output a label or a saliency map based on the image. As another example, a neural network may be tested as to how well it produces saliency maps or labels by providing the image 300 to the neural network and comparing a resulting saliency map or label with the second intermediate image 500.

FIG. 6 illustrates a low resolution image 600 that is a low resolution version of the second intermediate image 500. For example, low resolution saliency maps or labels may significantly reduce processing resources or processing time with little or no reduction in saliency or fixation prediction. In one embodiment the saliency component 202 may save the low resolution image 600 as a label for the image 300 of FIG. 3. With the low resolution, the low resolution image 600 includes low resolution blur regions 602-606 including a first low resolution blur region 602, a second low resolution blur region 604, and a third low resolution blur region 606.

In one embodiment, the low resolution image 600 may be used as a label for the image 300 of FIG. 3. For example, low resolution blur regions 602-606 may indicate regions of the data image 300 of FIG. 3 that should be processed or analyzed for object detection or recognition. In one embodiment, the low resolution image 600 may be combined with the data image 300 to generate a saliency map that can be processed for object recognition or detection. In one embodiment, the saliency component 202 may feed the low resolution image 600 and the image 300 into a neural network that outputs a saliency map. In one embodiment, the saliency component 202 may feed the low resolution image 600 and the image 300 into the training component 206 or testing component 208 to train or test operation of a neural network. For example, a neural network may be trained to output a label or a saliency map based on the image 300 (or any other image). As another example, a neural network may be tested as to how well it produces saliency maps or labels by providing the image 300 to the neural network and comparing a resulting saliency map or label with the low resolution image 600.

In one embodiment, the low resolution image 600 would be used as a label for the corresponding full image 300 of FIG. 3 in training, for example in training of a deep neural network. In this way, when any image is fed into the network, after the network has been trained, a corresponding label (map of likely salient regions) is produced. Furthermore, a (low resolution) saliency map may undergo post processing, for example thresholding with an original image, to extract regions of interest to be fed into a classifier for objects of interest (e.g., to detect pedestrians).

Although FIGS. 3-6 are discussed above in relation to images, other types of sensor data frames are contemplated within the scope of the present disclosure. For example, LIDAR frames, radar frames, ultrasound frames, or any other type of sensor data frame may be processed according to the processes and teaching provided above. For example, a data frame and bounding boxes for sub-regions of the data frame may be processed to produce a label for any type of data frame.

Figure 7:
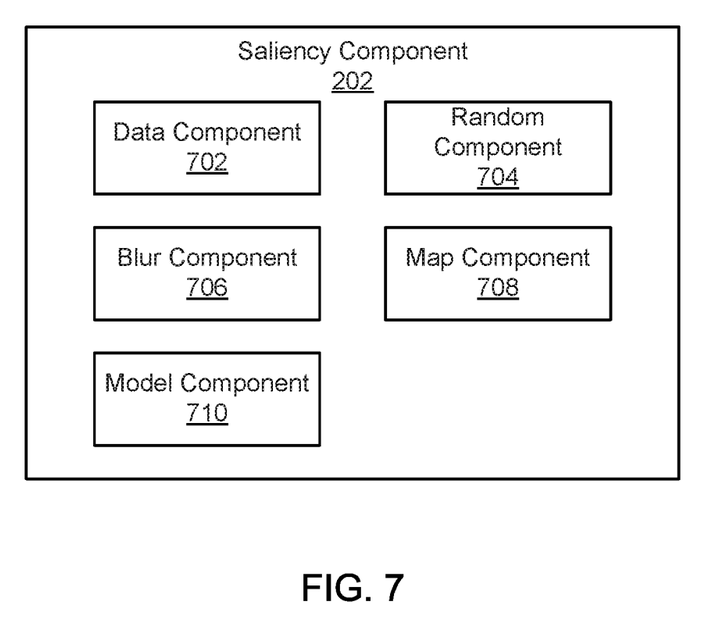
FIG. 7 is a schematic block diagram illustrating example components of a saliency component, according to one implementation.

FIG. 7 is a block diagram illustrating example components of a saliency component 202. In the depicted embodiment, the saliency component 202 includes a data component 702, a random component 704, a blur component 706, a map component 708, and a model component 710. The components 702-710 are given by way of illustration only and may not all be included in all embodiments. In fact, some embodiments may include only one or any combination of two or more of the components 702-710. Some of the components 702-710 may be located outside the saliency component 202.

The data component 702 is configured to receive a data image, or other sensor data, and any ground truth about the data image or sensor data. For example, the data component 702 may receive an image captured by a camera and an indication of one or more sub-regions within the image corresponding to one or more objects of interest. The image may include an image of a scene near a vehicle. For example, the image may include an image captured by a vehicle mounted camera. In one embodiment, the image may include a computer generated image of a simulated road or driving environment.

The ground truth may include real-world or virtual world ground truth about the driving environment in which the image was captured. For example, the ground truth may include one or more details about the objects of interest such as a classification, an orientation, and a relative location of the objects of interest with respect to a camera. In one embodiment, the ground truth includes bounding box information or other information that defines a region of the image in which an object of interest is located. The bounding boxes may be derived from input from humans who have viewed the images or may be computer generated. In one embodiment, the bounding box information is derived based on where a human looks when they look at an image or may be based on explicit input provided by a human, which identifies where objects of interest are located (e.g., by dragging a box over a region using a mouse, touch screen, or other device while the image is displayed). In one embodiment, the bounding box information may be generated by a computer. For example, if a data image was generated by a computer based on a simulated three-dimensional environment, the computer may also generate bounding boxes or other information indicating regions of the computer generated image where objects of interest are located.

The random component 704 is configured to generate an image with one or more random points within regions defined by or corresponding to the bounding boxes. For example, the random component 704 may create an image (such as the intermediate image 400 of FIG. 4) that includes one or more random points having a first color in regions corresponding to the bounding boxes and a remainder of the image having a second color. In one embodiment, the random component 704 creates a binary image that is black except for one or more random points within each bounding box region. In one embodiment, the binary image may include two different colors having any color. For example, the binary image is not necessarily white points on a black background, but may include any combination of two or more colors. In one embodiment, the random component 704 creates an image having the random points as part of a grayscale or color image.

The random component 704 may generate the random points using a random number generator or other randomizing algorithm. The random component 704 may generate random points within the regions corresponding to regions indicated in the ground truth received by the data component 702. In one embodiment, the random component 704 may generate a number of random points within a region based on a size of the region. For example, the random component 704 may determine a number of random points to generate in a sub-region based on a size of the sub-region. For example, regions with larger areas may have more random points than regions with smaller areas.

The blur component 706 is configured to apply a blurring algorithm to the image created by the random component 704, such as the first intermediate image 400 of FIG. 4. In one embodiment, the blur component 706 may apply a Gaussian blur to an image comprising one or more random points. The blur component 706 may blur the random points to spread over a larger area and thereby simulate a region corresponding to the bounding boxes. A blur may be fit or applied to a particular shape based on a type of object of interest. For example, a vertically oblong ellipse may reflect a general shape of pedestrians. In one embodiment, a blurring algorithm may be designed to produce a desired blur shape. For example, a blurring algorithm may blur an image differently in a horizontal direction than in a vertical direction to generate vertically or horizontally oblong shapes. Other blurring algorithms may also be used. In one embodiment, the blurred image (see e.g., FIG. 5) may be used as a label image for the corresponding data image received by the data component 702. In another embodiment, a low resolution image (see e.g., FIG. 6) may be stored and used as a label image for the corresponding data image received by the data component 702.

The map component 708 is configured to generate a saliency map for a data image based on a label image, such as a label image generated by the random component 704 and/or blur component 706. In one embodiment, the map component 708 is configured to generate a saliency map based on a data image and a label image. In one embodiment, the map component 708 is configured to generate the saliency map using a neural network that outputs the saliency map based on a data image and label image as input. The saliency map may include one or more details of a data image within blur regions or other regions defined by a label image or another image produced by the random component 704 and/or blur component 706. In one embodiment, the map component 708 may generate a saliency map by overlaying a data image with a label image using a threshold algorithm. For example, the data image may be converted to black in regions corresponding to black portions of a label while portions of the data image corresponding to the white regions may be converted to grayscale within the saliency map.

The model component 710 is configured to provide the virtual sensor data and/or ground truth to an algorithm for testing or training of a machine learning algorithm or model. For example, the model component 710 may provide a data image and a label image to the training component 206 or testing component 208 of FIG. 2. In another embodiment, the model component 710 may include the training component 206 and/or the testing component 208. For example, the data image and/or label image may be used to train or test a neural network, deep neural network, and/or convolution neural network to output a label image or saliency map. For example, the machine learning algorithm or model may be trained or tested for inclusion in the automated driving/assistance system 102 of FIG. 1. In one embodiment, the model component 710 provides a data image and a label image for training or testing a neural network to determine information about one or more objects based on the label image. In one embodiment, the model component 710 provides a data image and label image for training or testing a machine learning algorithm based on the saliency map and the label image. For example, the data image and/or label image may be used to train a neural network to output label images or saliency maps. After training, the neural network may then be able to produce a label image or saliency map image that indicates areas where an object of interest may be located given only a camera image.

Figure 8:
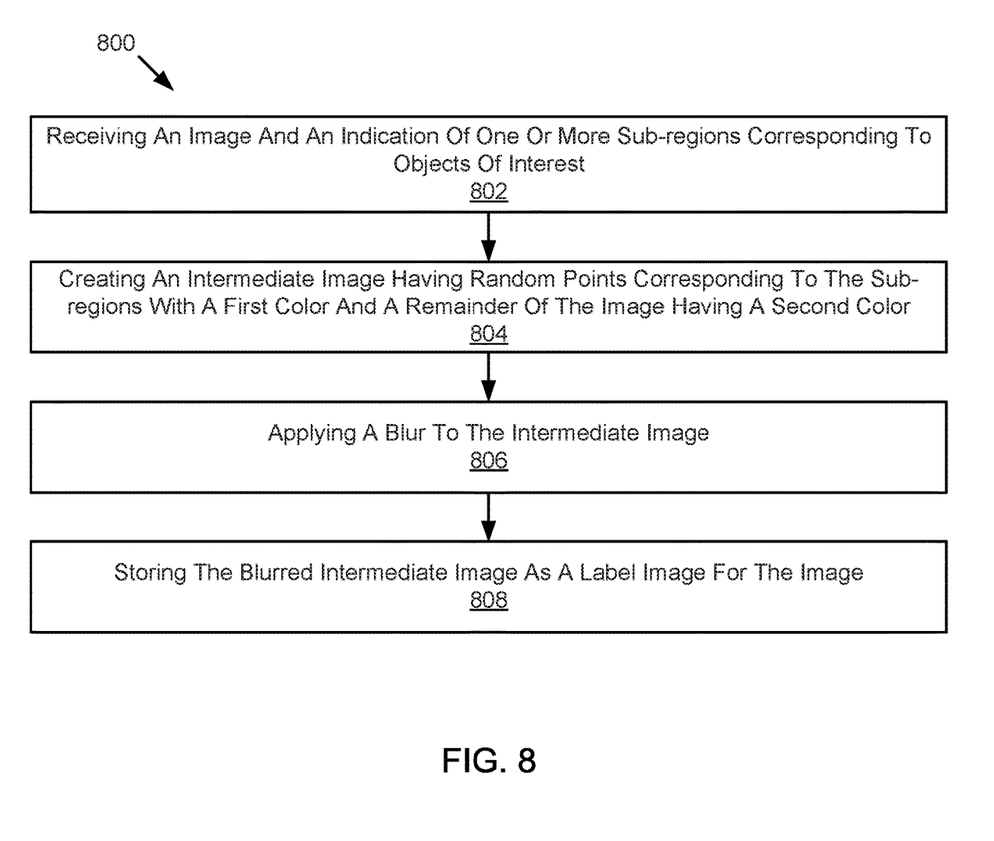
FIG. 8 is a schematic flow chart diagram illustrating a method for generating synthetic saliency maps, image labels, or fixation data, according to one implementation.

Referring now to FIG. 8, a schematic flow chart diagram of a method 800 for generating synthetic saliency maps or image labels is illustrated. The method 800 may be performed by a saliency component or a system for automatic fixation generation, such as the saliency component 202 of FIG. 2 or 7 or the system 200 of FIG. 2.

The method 800 begins and a data component 702 receives a first image and an indication of one or more sub-regions within the first image corresponding to one or more objects of interest at 802. A random component 704 creates an intermediate image that includes one or more random points on a background at 804. The random points have a first color and are located within regions corresponding to the sub-regions and a remainder of the intermediate image has a second color. A blur component 706 applies a blur to the intermediate image at 806 and the blurred intermediate image is stored at 808.

EXAMPLES

The following examples pertain to further embodiments.

Example 1 is a method that includes receiving a first image and an indication of one or more sub-regions within the first image corresponding to one or more objects of interest. The method includes generating and storing a label image. Generating the label image includes creating an intermediate image that has one or more random points with a first color in regions corresponding to the sub-regions. A remainder of the intermediate image has a second color. The method includes applying a Gaussian blur to the intermediate image and storing a blurred intermediate image as a label image.

In Example 2, generating the label image in Example 1 further includes creating and storing a low resolution version of the blurred intermediate image.

In Example 3, applying the Gaussian blur in any of Examples 1-2 includes generating an ellipses shaped blur for each of the one or more random points.

In Example 4, the method of any of Examples 1-3 further includes generating a saliency map based on the first image and the label image.

In Example 5, generating the saliency map in Example 4 includes generating using a neural network that outputs the saliency map based on the first image and the label image.

In Example 6, creating the intermediate image in any of Examples 1-5 includes creating a binary image.

In Example 7, creating the intermediate image in any of Examples 1-6 includes determining a number of random points in a sub-region of the one or more sub-regions based on a size of the sub-region of the one or more sub-regions.

In Example 8, the method of any of Examples 1-7 further includes training or testing a neural network to determine information about one or more objects based on the label image or to generate one or more of a label image and a saliency map based on a data image.

Example 9 is a system for generating artificial saliency maps that includes a data component, a random component, a blur component, and a map component. The data component is configured to receive a first image and ground truth corresponding to the first image. The ground truth includes an indication of one or more sub-regions within the first image corresponding to one or more objects of interest. The random component is configured to create an intermediate image that includes one or more random points having a first color in regions corresponding to the sub-regions. A remainder of the intermediate image has a second color. The blur component is configured to apply a blur to the intermediate image to generate a label image. The map component is configured to create a saliency map based on the label image and the first image.

In Example 10, the system of Example 9 further includes a model component configured to train or testing a machine learning algorithm based on the saliency map and the label image.

In Example 11, the ground truth in Example 9 further includes one or more details about the objects of interest, the one or more details comprising one or more of a classification, an orientation, and a relative location of the objects of interest. The model component is configured to train or test the machine learning algorithm or model based on the one or more details about the objects of interest.

In Example 12, the blur component in any of Examples 9-11 is configured to generate the label image by producing a low resolution label image and the map component is configured to create the saliency map based on the low resolution label image.

In Example 13, the blur component in any of Examples 9-12 is configured to apply a Gaussian blur.

In Example 14, the random component in any of Examples 9-13 is configured to determine and create a number of random points in a sub-region of the one or more sub-regions based on a size of the sub-region of the one or more sub-regions.

Example 15 is computer readable storage media storing instructions that, when executed by one or more processors, cause the one or more processors to receive a first image and an indication of one or more sub-regions within the first image corresponding to one or more objects of interest. The instructions further cause the one or more processors to create an intermediate image having one or more random points comprising a first color in regions corresponding to the sub-regions. A remainder of the intermediate image has a second color. The instructions further cause the one or more processors to apply a Gaussian blur to the intermediate image to produce a label image. The instructions further cause the one or more processors to store and associate the label image with the first image.

In Example 16, the instructions of Example 15 further cause the one or more processors to create and store a low resolution of the blurred intermediate image as the label image.

In Example 17, the instructions in any of Examples 15-16 further cause the one or more processors to fit the Gaussian blur to an ellipses shaped region.

In Example 18, the instructions in any of Examples 15-17 cause the one or more processors to generate a saliency map based on the first image and the label image using a neural network that outputs the saliency map based on the first image and the label image.

In Example 19, the instructions in any of Examples 15-18 further cause the one or more processors to train or test a neural network to determine information about one or more objects based on the label image.

In Example 20, the instructions in any of Examples 15-19 cause the one or more processors to determine and create a number of random points region based on a size of a corresponding sub-region of the one or more sub-regions.

Example 21 is a system or device that includes means for implementing a method or realizing a system or apparatus as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method comprising:
    identifying a ground truth bounding box corresponding to an object of interest in a first image;
    executing a randomization algorithm to generate an intermediate image comprising one or more random points within a region corresponding to the ground truth bounding box of the first image, wherein a quantity of random points is determined based on a size of the ground truth bounding box;
    generating a blurred intermediate image by applying a blur to each of the one or more random points in the intermediate image; and
    storing the blurred intermediate image as a label image for the first image.

2. The method of claim 1, further comprising pairing the first image and the label image and feeding the pair of images to a modified deep neural network configured to output a synthetic saliency map to predict a location of an object within any image.

3. The method of claim 1, wherein the blur applied to each of the one or more random points in the intermediate image comprises an ellipses shaped blur configured to predict a scale and location of the object of interest.

4. The method of claim 1, further comprising downsizing the blurred intermediate image to generate a low-resolution version of the blurred intermediate image, and wherein storing the blurred intermediate image as the label image comprises storing the low-resolution version of the blurred intermediate image.

5. The method of claim 1, further comprising training a neural network to determine information about any object of interest in an image by using the first image and the label image as training data for the neural network.

6. The method of claim 5, wherein the neural network consumes the first image and the label image and outputs a synthetic saliency map based on the first image and label image.

7. The method of claim 6, wherein the synthetic saliency map mimics human perception for object detection.

8. The method of claim 1, further comprising calculating the quantity of random points to generate within the ground truth bounding box based on the size of the ground truth bounding box.

9. The method of claim 1, wherein generating the blurred intermediate image comprises applying a Gaussian blur to the intermediate image.

10. A system comprising one or more processors that are programmable to execute instructions stored in non-transitory computer readable storage media, the instructions comprising
   identifying a ground truth bounding box corresponding to an object of interest in a first image;
   applying a randomization algorithm to generate an intermediate image comprising one or more random points within a region corresponding to the ground truth bounding box of the first image, wherein a quantity of random points is determined based on a size of the ground truth bounding box;
   generating a blurred intermediate image by applying a blur to each of the one or more random points in the intermediate image; and
   storing the blurred intermediate image as a label image for the first image.

11. The system of claim 10, wherein the instructions further comprise pairing the first image and the label image and feeding the pair of image to a modified deep neural network configured to output a synthetic saliency map to predict a location of an object within any image.

12. The system of claim 10, wherein the instructions further comprise receiving ground truth about the object of interest within the ground truth bounding box, wherein the ground truth comprises one or more of a classification, an orientation, and a relative location of the object of interest.

13. The system of claim 10, wherein a machine learning algorithm or model is configured to consume the first image and the label image and output a synthetic saliency map, wherein the synthetic saliency map mimics human perception for object detection.

14. The system of claim 10, wherein the blur applied to each of the one or more random points in the intermediate image comprises an ellipses shaped blur configured to predict a scale and location of the object of interest.

15. The system of claim 10, wherein the instructions further comprise calculating the quantity of random points to generate within the ground truth bounding box based on the size of the ground truth bounding box.

16. Non-transitory computer readable storage media storing instructions to be executed by one or more processors, the instructions comprising:
   identifying a ground truth bounding box corresponding to an object of interest in a first image;
   applying a randomization algorithm to generate an intermediate image comprising one or more random points within a region corresponding to the ground truth bounding box of the first image, wherein a quantity of random points is determined based on a size of the ground truth bounding box;
   generating a blurred intermediate image by applying a blur to each of the one or more random points in the intermediate image; and
   storing the blurred intermediate image as a label image for the first image.

17. The non-transitory computer readable storage media of claim 16, wherein the instructions further comprise pairing the first image and the label image and feeding the pair of images to a modified deep neural network configured to output a synthetic saliency map to predict a location of an object within any image.

18. The non-transitory computer readable storage media of claim 16, wherein the instructions are such that blurring each of the one or more random points in the intermediate image comprises applying a Gaussian blur to generate an ellipses shaped blur configured to predict a scale and location of the object of interest.

19. The non-transitory computer readable storage media of claim 16, wherein the instructions further comprise training a neural network to generate a synthetic saliency map that mimics human perception for object detection by providing the blurred intermediate image and the label image to the neural network as a training dataset.

20. The non-transitory computer readable storage media of claim 16, wherein the instructions further comprise calculating the quantity of random points to generate within the ground truth bounding box based on the size of the ground truth bounding box.

* * * * *